United States Patent
Lauridsen et al.

(10) Patent No.: US 12,445,924 B2
(45) Date of Patent: Oct. 14, 2025

(54) ANTENNA GAIN-BASED HANDOVER PROCEDURE FOR NTN

(71) Applicant: Nokia Technologies Oy, Espoo (FI)

(72) Inventors: Mads Lauridsen, Aalborg (DK); Jeroen Wigard, Aalborg (DK); Enric Martinez, Aalborg (DK)

(73) Assignee: NOKIA TECHNOLOGIES OY, Espoo (FI)

(*) Notice: Subject to any disclaimer, the term of this patent is extended or adjusted under 35 U.S.C. 154(b) by 0 days.

(21) Appl. No.: 18/921,681

(22) Filed: Oct. 21, 2024

(65) Prior Publication Data

US 2025/0056354 A1   Feb. 13, 2025

Related U.S. Application Data

(63) Continuation of application No. PCT/EP2022/060988, filed on Apr. 26, 2022.

(51) Int. Cl.
*H04W 4/00* (2018.01)
*H04W 36/08* (2009.01)
*H04W 36/32* (2009.01)

(52) U.S. Cl.
CPC ....... *H04W 36/083* (2023.05); *H04W 36/322* (2023.05)

(58) Field of Classification Search
CPC .......................... H04W 36/083; H04W 36/322
USPC ........................................................ 455/427
See application file for complete search history.

(56) References Cited

U.S. PATENT DOCUMENTS

| | | | | | |
|---|---|---|---|---|---|
| 5,161,248 | A | * | 11/1992 | Bertiger | H04W 36/083 |
| | | | | | 455/12.1 |
| 5,276,906 | A | * | 1/1994 | Felix | H04W 36/302 |
| | | | | | 455/438 |
| 5,408,237 | A | * | 4/1995 | Patterson | H01Q 3/24 |
| | | | | | 455/12.1 |

(Continued)

FOREIGN PATENT DOCUMENTS

WO   2017/189862 A1   11/2017

OTHER PUBLICATIONS

"3rd Generation Partnership Project, Technical Specification Group Radio Access Network; NR; Radio Resource Control (RRC) protocol specification (Release 16)", 3GPP TS 38.331, V16.7.0, Dec. 2021, pp. 1-963.

"3rd Generation Partnership Project; Technical Specification Group Radio Access Network; Solutions for NR to support non-terrestrial networks (NTN) (Release 16)", 3GPP TR 38.821, V16.1.0, May 2021, pp. 1-140.

(Continued)

*Primary Examiner* — Amancio Gonzalez
(74) *Attorney, Agent, or Firm* — Carter, DeLuca & Farrell LLP

(57) ABSTRACT

Method comprising:
receiving, from a first cell of a satellite, a handover command triggering a handover of a terminal from the first cell of the satellite to a second cell of the satellite and an assumed location of the terminal;
determining an actual location of the terminal;
checking one or more of the following conditions applies:
the actual location of the terminal deviates from the assumed location by more than a first threshold, and the actual location of the terminal is on the side of the first cell of the coverage boundary and remote from the coverage boundary by at least a second threshold;
preventing the terminal from performing the handover if at least one of the one or more checked conditions is fulfilled.

16 Claims, 7 Drawing Sheets

(56) References Cited

U.S. PATENT DOCUMENTS

| | | | | |
|---|---|---|---|---|
| 5,483,664 A * | 1/1996 | Moritz | H04W 36/083 | 455/12.1 |
| 5,559,806 A * | 9/1996 | Kurby | H04B 7/2041 | 455/562.1 |
| 5,574,968 A * | 11/1996 | Olds | H04B 7/18541 | 455/436 |
| 5,602,833 A * | 2/1997 | Zehavi | H04J 13/0074 | 370/335 |
| 5,649,291 A * | 7/1997 | Tayloe | H04B 7/18541 | 370/332 |
| 5,678,184 A * | 10/1997 | Cutler, Jr. | H04B 7/18541 | 455/13.1 |
| 5,736,959 A * | 4/1998 | Patterson | H04B 7/18589 | 342/372 |
| 5,752,187 A * | 5/1998 | Frank | H04W 36/302 | 370/316 |
| 5,752,194 A * | 5/1998 | Lin | H04W 16/18 | 455/509 |
| 5,784,695 A * | 7/1998 | Upton | H04B 7/18541 | 455/442 |
| 5,956,644 A * | 9/1999 | Miller | H04B 7/18567 | 455/12.1 |
| 5,991,629 A * | 11/1999 | Agrawal | H04W 52/0225 | 455/452.2 |
| 6,021,309 A * | 2/2000 | Sherman | H04B 7/18539 | 455/12.1 |
| 6,094,427 A * | 7/2000 | Yi | H04L 1/02 | 455/442 |
| 6,108,538 A * | 8/2000 | Blasiak | H04B 7/18541 | 455/12.1 |
| 6,122,499 A * | 9/2000 | Magnusson | H04M 3/2281 | 455/430 |
| 6,138,012 A * | 10/2000 | Krutz | H04B 7/18513 | 455/272 |
| 6,246,874 B1 * | 6/2001 | Voce | H04B 7/18541 | 455/13.1 |
| RE37,757 E * | 6/2002 | Frank | H04B 7/18541 | 370/316 |
| 6,463,279 B1 * | 10/2002 | Sherman | H04B 7/18563 | 455/12.1 |
| 6,522,875 B1 * | 2/2003 | Dowling | H04L 67/55 | 455/414.3 |
| 6,549,780 B2 * | 4/2003 | Schiff | H04B 7/18541 | 455/439 |
| 6,600,921 B1 * | 7/2003 | Pietrusiak | H04B 7/2041 | 455/427 |
| 7,002,918 B1 * | 2/2006 | Prieto, Jr. | H04B 7/18582 | 370/252 |
| 7,092,725 B2 * | 8/2006 | Anderson | H04B 7/1855 | 455/67.11 |
| 7,593,726 B2 * | 9/2009 | Karabinis | H04B 7/18539 | 455/448 |
| 7,706,746 B2 * | 4/2010 | Karabinis | H04B 7/2041 | 455/448 |
| 7,792,488 B2 * | 9/2010 | Karabinis | H04B 7/2041 | 455/448 |
| 8,004,959 B2 * | 8/2011 | Dent | H04J 13/105 | 375/140 |
| 8,244,253 B2 * | 8/2012 | Choi | H04W 36/0016 | 370/328 |
| 8,929,894 B2 * | 1/2015 | Catovic | H04W 36/0094 | 370/242 |
| 9,008,233 B2 * | 4/2015 | Burzigotti | H04B 7/18515 | 375/324 |
| 9,265,076 B2 * | 2/2016 | Schmidt | H04W 76/11 | |
| 9,282,494 B2 | 3/2016 | Folke et al. | | |
| 9,331,800 B2 * | 5/2016 | Walker | H04H 20/26 | |
| 9,888,426 B2 * | 2/2018 | Ulupinar | H04B 7/18541 | |
| 10,009,093 B2 * | 6/2018 | Purkayastha | H04B 7/2041 | |
| 10,097,316 B2 * | 10/2018 | Damnjanovic | H04L 1/1822 | |
| 10,110,298 B2 * | 10/2018 | Miller | H04B 7/18523 | |
| 10,135,521 B2 * | 11/2018 | Oza | H04B 7/18513 | |
| 10,136,438 B2 * | 11/2018 | Chan | H04B 7/18513 | |
| 10,153,832 B2 * | 12/2018 | Damnjanovic | H04L 1/1812 | |
| 10,383,025 B2 * | 8/2019 | Lim | H04W 36/0058 | |
| 10,425,865 B2 * | 9/2019 | Damnjanovic | H04W 16/28 | |
| 10,506,483 B1 * | 12/2019 | Williamson | H04B 7/18584 | |
| 10,517,116 B2 * | 12/2019 | Damnjanovic | H04W 72/21 | |
| 10,541,745 B2 * | 1/2020 | Ravishankar | H04B 7/18528 | |
| 10,594,046 B2 * | 3/2020 | Hreha | H04B 7/043 | |
| 10,798,611 B2 * | 10/2020 | Lei | H04W 28/0226 | |
| 11,032,751 B2 * | 6/2021 | Arur | H04B 7/195 | |
| 11,044,647 B2 * | 6/2021 | Wang | H04W 36/04 | |
| 11,115,114 B2 * | 9/2021 | Treesh | H04B 7/2041 | |
| 11,121,765 B2 * | 9/2021 | Kim | H04B 17/382 | |
| 11,411,640 B2 * | 8/2022 | Rothaar | H04B 7/18541 | |
| 11,533,104 B2 * | 12/2022 | Elshafiy | H04B 7/18563 | |
| 11,558,791 B1 * | 1/2023 | Vivanco | H04W 36/0061 | |
| 11,588,542 B2 * | 2/2023 | Ravishankar | H04B 7/2041 | |
| 11,595,112 B2 * | 2/2023 | Kusashima | H04L 5/0032 | |
| 11,616,566 B2 * | 3/2023 | Oza | H04B 7/18534 | 455/3.02 |
| 11,659,599 B2 * | 5/2023 | Ma | H04W 74/0833 | 370/336 |
| 11,696,189 B2 * | 7/2023 | Xu | H04W 36/00837 | 455/428 |
| 11,750,278 B2 * | 9/2023 | Regunathan | H04B 7/1855 | 455/12.1 |
| 11,785,643 B2 * | 10/2023 | Ma | H04L 41/0803 | 370/254 |
| 11,811,432 B2 * | 11/2023 | Edge | H04B 7/18513 | |
| 11,895,546 B2 * | 2/2024 | Cheng | H04W 36/0085 | |
| 11,917,465 B2 * | 2/2024 | Wang | H04W 36/362 | |
| 11,956,688 B2 * | 4/2024 | Atungsiri | H04W 4/023 | |
| 11,963,149 B2 * | 4/2024 | Fan | H04B 7/18519 | |
| 11,997,593 B2 * | 5/2024 | Liberg | G01S 19/254 | |
| 12,009,901 B2 * | 6/2024 | Wei | H04B 7/1851 | |
| 12,035,189 B2 * | 7/2024 | Määttänen | H04W 36/00837 | |
| 12,040,880 B2 * | 7/2024 | Speidel | H04W 16/10 | |
| 12,069,530 B2 * | 8/2024 | Wei | H04W 36/0088 | |
| 12,074,933 B2 * | 8/2024 | Slater | H04L 67/568 | |
| 12,101,169 B2 * | 9/2024 | Fan | H04W 72/0453 | |
| 12,120,749 B2 * | 10/2024 | Nishio | H04W 74/002 | |
| 12,133,189 B2 * | 10/2024 | Hajir | H04W 56/006 | |
| 12,135,379 B2 * | 11/2024 | Lee | H04W 76/20 | |
| 12,231,223 B2 * | 2/2025 | Wang | H04W 48/20 | |
| 2010/0234071 A1 * | 9/2010 | Shabtay | H04B 7/155 | 455/562.1 |
| 2016/0381656 A1 * | 12/2016 | Bevan | H04W 16/28 | 370/252 |
| 2017/0041850 A1 | 2/2017 | Benammar et al. | | |
| 2019/0053214 A1 * | 2/2019 | Chan | H04B 7/18541 | |
| 2019/0230568 A1 | 7/2019 | Arur et al. | | |
| 2020/0052782 A1 | 2/2020 | Wang et al. | | |
| 2021/0250816 A1 | 8/2021 | Xu et al. | | |
| 2021/0377828 A1 * | 12/2021 | Tao | H04W 36/0058 | |
| 2022/0182892 A1 * | 6/2022 | Chen | H04W 36/324 | |
| 2022/0225208 A1 * | 7/2022 | Wang | H04W 40/248 | |
| 2022/0232447 A1 * | 7/2022 | Lu | H04W 36/302 | |
| 2022/0240151 A1 * | 7/2022 | Yu | H04B 7/01 | |
| 2022/0279394 A1 * | 9/2022 | Gao | H04B 7/18541 | |
| 2022/0368411 A1 * | 11/2022 | Speidel | H04B 7/18513 | |
| 2022/0376779 A1 * | 11/2022 | Atungsiri | H04W 52/0229 | |
| 2022/0386200 A1 * | 12/2022 | Wang | H04W 36/362 | |
| 2023/0024479 A1 * | 1/2023 | Ciochina | H04B 7/18541 | |
| 2023/0041601 A1 * | 2/2023 | Vangala | H04W 36/322 | |
| 2023/0125129 A1 * | 4/2023 | You | H04W 48/20 | 455/422.1 |
| 2023/0133633 A1 * | 5/2023 | Park | H04W 56/0015 | 370/331 |
| 2023/0141380 A1 * | 5/2023 | Yu | H04W 72/40 | 370/329 |
| 2023/0209413 A1 * | 6/2023 | Jung | H04W 36/0005 | 370/316 |
| 2023/0239719 A1 * | 7/2023 | Cui | H04W 28/0215 | 370/329 |
| 2023/0247506 A1 * | 8/2023 | Xu | H04W 36/0064 | 370/331 |
| 2023/0254900 A1 * | 8/2023 | Khan | H04W 74/004 | 370/329 |

(56) References Cited

U.S. PATENT DOCUMENTS

| | | | |
|---|---|---|---|
| 2023/0269780 A1* | 8/2023 | Ravishankar | H04B 7/18539 370/329 |
| 2023/0308167 A1* | 9/2023 | Lee | H04W 76/19 |
| 2023/0358843 A1* | 11/2023 | Ghimire | H04W 12/104 |
| 2023/0370133 A1* | 11/2023 | Greinke | H04B 7/086 |
| 2023/0370154 A1* | 11/2023 | Ciochina | H04W 74/0833 |
| 2023/0379045 A1* | 11/2023 | Greinke | H04B 7/18513 |
| 2023/0388875 A1* | 11/2023 | Gao | H04W 36/008357 |
| 2023/0388876 A1* | 11/2023 | Xiong | H04W 48/16 |
| 2024/0040457 A1* | 2/2024 | Hong | H04W 36/083 |
| 2024/0049092 A1* | 2/2024 | Määttänen | H04B 7/18541 |
| 2024/0049307 A1* | 2/2024 | Lin | H04B 7/18532 |
| 2024/0072887 A1* | 2/2024 | Xiong | H04B 7/185 |
| 2024/0073963 A1* | 2/2024 | Lin | H04W 74/006 |
| 2024/0120992 A1* | 4/2024 | Li | H04W 36/322 |
| 2024/0162978 A1* | 5/2024 | Cheema | H04W 36/12 |
| 2024/0179654 A1* | 5/2024 | Wong | H04W 56/006 |
| 2024/0187955 A1* | 6/2024 | Wu | H04W 36/362 |
| 2024/0204866 A1* | 6/2024 | Ciochina | H04B 7/1851 |
| 2024/0251322 A1* | 7/2024 | Han | H04W 36/30 |
| 2024/0365268 A1* | 10/2024 | Mahalingam | H04W 74/0833 |
| 2024/0388409 A1* | 11/2024 | Teyeb | H04B 17/318 |
| 2024/0389159 A1* | 11/2024 | Lee | H04L 5/0087 |
| 2024/0430782 A1* | 12/2024 | Zaus | H04W 48/12 |

OTHER PUBLICATIONS

"Solutions for NR to support non-terrestrial networks (NTN)", 3GPP TSG RAN meeting #90-e, RP-202908, Agenda: 9.8.6, Thales, Dec. 7-11, 2020, 10 pages.

Juan et al., "5G New Radio Mobility Performance in LEO-based Non-Terrestrial Networks", IEEE Globecom Workshops (GC Wkshps), Dec. 7-11, 2020, 6 pages.

Juan et al., "Performance Evaluation of the 5G NR Conditional Handover in LEO-based Non-Terrestrial Networks", IEEE Wireless Communications and Networking Conference (WCNC), Apr. 10-13, 2022, pp. 2488-2493.

International Search Report and Written Opinion received for corresponding Patent Cooperation Treaty Application No. PCT/EP2022/060988, dated Dec. 8, 2022, 13 pages.

"WF for CHO in NTN", 3GPP TSG RAN WG2 #113b-e, R2-2103632, Agenda: 8.10.3.3, Huawei, Apr. 12-20, 2021, 8 pages.

"Handover Enhancements and Power-saving Neighbor Search for an NTN", 3GPP TSG RAN WG2 Meeting #114-e, R2-2106071, Agenda: 8.10.3.3, Samsung, May 19-27, 2021, 8 pages.

Demir et al., "On the Performance of Handover Mechanisms for Non-Terrestrial Networks", arXiv, Jan. 13, 2022, 5 pages.

European Office Action for Application No. 22 725 479.4 dated May 7, 2025, 7 pages total.

* cited by examiner

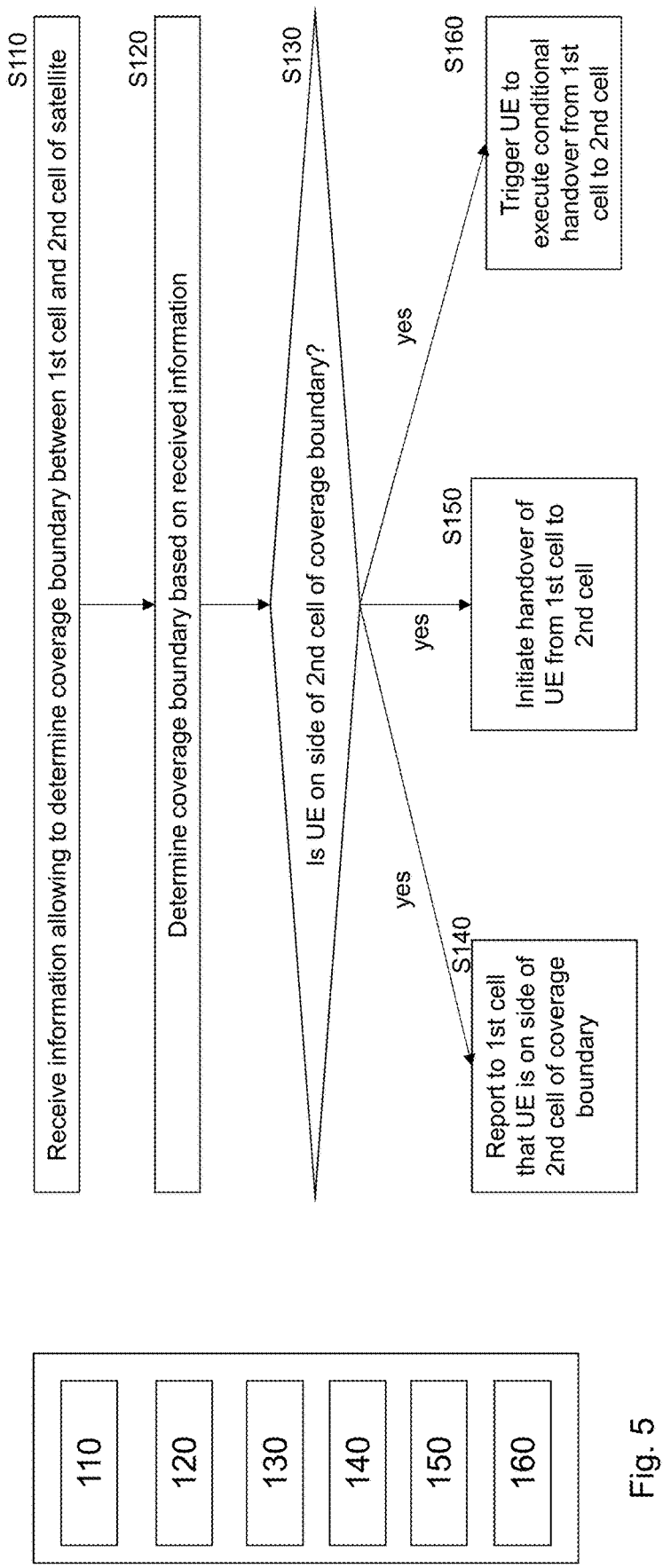

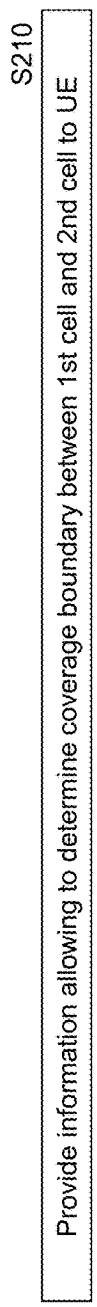
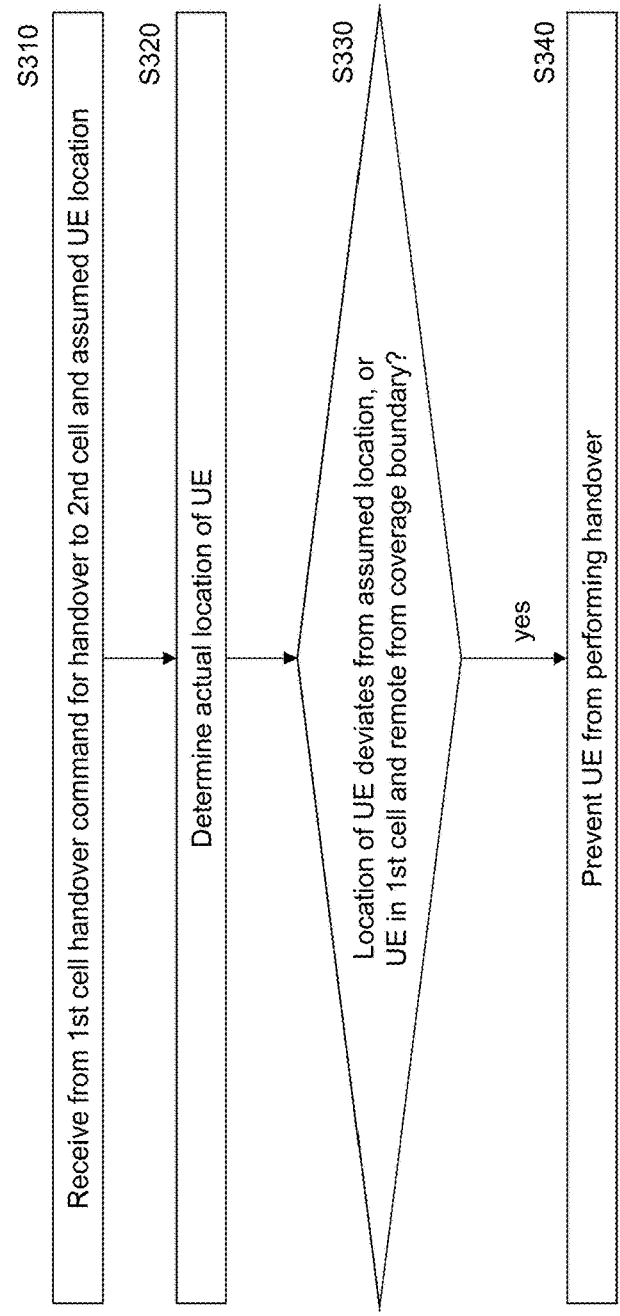
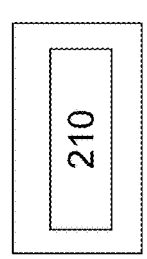

ANTENNA GAIN-BASED HANDOVER PROCEDURE FOR NTN

RELATED APPLICATIONS

The present application is a 37 C.F.R. § 1.53 (b) continuation of PCT Application No. PCT/EP2022/060988, filed on Apr. 26, 2022, which is incorporated herein by reference in its entirety.

FIELD OF THE INVENTION

The present disclosure relates to intra-satellite handover for NTN. In particular, it relates to a handover procedure based on antenna gain.

Abbreviations
- 3GPP 3$^{rd}$ Generation Partnership Project
- 5G/6G/7G 5$^{th}$/6$^{th}$/7$^{th}$ Generation
- AG Antenna Gain
- CHO Conditional Handover
- CU Central Unit
- DL Downlink
- DU Distributed Unit
- EFC Earth-Fixed Cells
- EMC Earth-Moving Cells
- FFS For Further Study
- GNSS Global Navigation Satellite System
- HAPS High Altitude Pseudo Satellite
- HO Handover
- IE Information Element
- LEO Low-Earth Orbit
- MR Measurement Report
- NR New Radio
- NTN Non-Terrestrial Networks
- NW Network
- PCell Primary Cell
- RLF Radio Link Failure
- RRC Radio Resource Management
- RSRP Reference Signal Received Power
- RSRQ Reference Signal Received Quality
- SIB System Information Block
- TA Timing Advance
- TR Technical Report
- TS Technical Specification
- UE User Equipment
- UL Uplink
- WI Work Item

BACKGROUND

3GPP has concluded a study item on non-terrestrial networks (NTN) for the fifth generation New Radio (5G NR) in Rel-16. The outcome, including recommendations on future work, is provided in the technical report 3GPP TR 38.821. The target is to provide 5G NR service to users on Earth, e.g. through Low-Earth Orbit (LEO), geostationary satellites and HAPS. In Rel-17, 3GPP has conducted a WI on the same topics (RP-202908), which defines the required specification changes to support NR over NTN. Further enhancements are defined in a release 18 work item starting later in 2022.

The NTN WI is, amongst other scenarios, targeting LEO satellites at altitudes of 500-1500 km. Each LEO satellite may provide NR service on Earth through one or more satellite beams and NR cells. Due to their low altitude, the satellites move with a speed of about 7.5 km/s relative to Earth. In 3GPP Earth-fixed cells (EFC) and Earth-moving cells (EMC) are considered. The former entails the satellite continuously adjusting the satellite beam pointing direction to fix the NR cell and NR beam to a specific point on Earth, while the latter option entails the satellite beam pointing direction being fixed relative to the satellite and, thus, the beam footprint (i.e. NR cell) is moving on Earth.

The movement of the satellites and thus "change" of signals from the network (NW) node leads to several issues. One of them is that the number of mobility events is rather high. The number of mobility events depends on the cell sizes. These range from about 25 km radius to several 100 kilometers (see 3GPP TR 38.821 for examples).

A target of connected-state mobility is to ensure that the UE does not experience noticeable service interruption or degradation as it moves across cells. The conventional mobility procedure, also known as handover (HO), relies on UE measurements (RSRP, RSRQ) from the serving and neighbouring cells. The UE will send a measurement report (MR) when one of the configured measurement-based triggering conditions has been fulfilled and based on such information, the NW will decide towards which cell to attempt the new connection.

In EMC-based NTN the mobility is mainly due to satellite movement as they move much faster than UEs on the ground. Current specification of the triggering conditions purely based on UE measurements might lead to an increase of the number of undesired HOs and/or the number of service failures as acknowledged in E. Juan "5G New Radio Mobility Performance in LEO-based Non-Terrestrial Networks" GlobeCom 2020 and E. Juan "Performance Evaluation of the 5G NR Conditional Handover in LEO-based Non-Terrestrial Networks", WCNC 2022.

Recent discussions in 3GPP suggest considering enhancements based on additional triggering criteria based on time, timers, UE location and/or satellites position to reach optimal mobility performance. So far 3GPP has agreed UE can be aware of "cell stop serving time" for EFC and also use distance-based metrics comparing UE location with reference points in the serving and target cells. Note that in NTN the UEs are assumed to have GNSS and, thus, are aware of their own location. Furthermore, the NW has knowledge of the ephemeris data (i.e. the satellites' position and orbit(s)), which it will share with the UE through broadcasting a System Information Block comprising the ephemeris data. The solutions discussed in 3GPP require a large load of signalling operations which can compromise the mobility performance and impact UE's throughput.

RAN2 has agreed the following:

RAN2 #114:
1. Support CHO location trigger as the distance between UE and a reference location which may be configured as the serving cell reference location or the candidate target cell reference location. FFS if combination can be allowed.
2. The reference location for the event description is defined as cell center.

RAN2 #115:
1. The following event is supported: condEvent L4: Distance between UE and the PCell's reference location becomes larger than absolute threshold1 AND the distance between UE and the Conditional reconfiguration candidate becomes shorter than absolute threshold2.

RAN2 #116bis:
1. A new NTN-specific SIB is introduced (SIBx), scheduled by SIB1
2. Introduce the following serving cell information to the corresponding SIBx (scheduled by SIB1):

Ephemeris;
common TA parameters;
validity duration for UL sync information;
t-Service;
cell reference location;
Epoch time.

SUMMARY

It is an object of the present invention to improve the prior art.

According to a first aspect of the invention, there is provided an apparatus comprising:
one or more processors, and memory storing instructions that, when executed by the one or more processors, cause the apparatus to perform:
receiving information allowing to determine a coverage boundary between a first cell of a satellite and a second cell of the satellite;
determining the coverage boundary based on the received information;
checking whether the terminal is on the side of the second cell of the coverage boundary and the terminal is being served by the first cell;
if the terminal is on the side of the second cell of the coverage boundary and being served by the first cell, performing at least one of:
reporting to the first cell that the terminal is on the side of the second cell of the coverage boundary;
initiating a handover of the terminal from the first cell to the second cell; and
triggering the terminal to execute a conditional handover from the first cell to the second cell if the terminal is configured for the conditional handover.

According to a second aspect of the invention, there is provided an apparatus comprising:
one or more processors, and
memory storing instructions that, when executed by the one or more processors, cause the apparatus to perform:
providing, to a terminal, information allowing to determine a coverage boundary between a first cell of a satellite and a second cell of the satellite.

According to a third aspect of the invention, there is provided an apparatus comprising:
one or more processors, and
memory storing instructions that, when executed by the one or more processors, cause the apparatus to perform:
receiving, from a first cell of a satellite, a handover command triggering a handover of a terminal from the first cell of the satellite to a second cell of the satellite and an assumed location of the terminal;
determining an actual location of the terminal;
checking one or more of the following conditions applies:
the actual location of the terminal deviates from the assumed location by more than a first threshold, and the actual location of the terminal is on the side of the first cell of the coverage boundary and remote from the coverage boundary by at least a second threshold;
preventing the terminal from performing the handover if at least one of the one or more checked conditions is fulfilled.

According to a fourth aspect of the invention, there is provided an apparatus comprising:
one or more processors, and
memory storing instructions that, when executed by the one or more processors, cause the apparatus to perform:
determining a coverage boundary between a first cell of a satellite and a second cell of the satellite on earth;
checking whether a stored first location of a terminal on the earth is on the side of the second cell of the coverage boundary;
instructing the terminal by a handover command to handover from the first cell to the second cell if the first location is on the side of the second cell of the coverage boundary.

According to a fifth aspect of the invention, there is provided a method comprising:
receiving information allowing to determine a coverage boundary between a first cell of a satellite and a second cell of the satellite;
determining the coverage boundary based on the received information;
checking whether the terminal is on the side of the second cell of the coverage boundary and the terminal is being served by the first cell;
if the terminal is on the side of the second cell of the coverage boundary and being served by the first cell, performing at least one of:
reporting to the first cell that the terminal is on the side of the second cell of the coverage boundary;
initiating a handover of the terminal from the first cell to the second cell; and
triggering the terminal to execute a conditional handover from the first cell to the second cell if the terminal is configured for the conditional handover.

According to a sixth aspect of the invention, there is provided a method comprising:
providing, to a terminal, information allowing to determine a coverage boundary between a first cell of a satellite and a second cell of the satellite.

According to a seventh aspect of the invention, there is provided a method comprising:
receiving, from a first cell of a satellite, a handover command triggering a handover of a terminal from the first cell of the satellite to a second cell of the satellite and an assumed location of the terminal;
determining an actual location of the terminal;
checking one or more of the following conditions applies:
the actual location of the terminal deviates from the assumed location by more than a first threshold, and the actual location of the terminal is on the side of the first cell of the coverage boundary and remote from the coverage boundary by at least a second threshold;
preventing the terminal from performing the handover if at least one of the one or more checked conditions is fulfilled.

According to an eighth aspect of the invention, there is provided a method comprising:
determining a coverage boundary between a first cell of a satellite and a second cell of the satellite on earth;
checking whether a stored first location of a terminal on the earth is on the side of the second cell of the coverage boundary;
instructing the terminal by a handover command to handover from the first cell to the second cell if the first location is on the side of the second cell of the coverage boundary.

Each of the methods of the fifth to eighth aspects of the invention maybe a method of handover in a NTN.

According to a ninth aspect of the invention, there is provided a computer program product comprising a set of instructions which, when executed on an apparatus, is configured to cause the apparatus to carry out the method according to any of the fifth to eighth aspects. The computer program product may be embodied as a computer-readable medium or directly loadable into a computer.

According to some embodiments of the invention, at least one of the following advantages may be achieved:
mobility performance is improved;
signaling load is lower than in conventional methods;
too late intra-satellite handovers may be avoided;
intra-satellite handover triggering does not depend on UE measurements, which may be inaccurate (non-negligible UE measurement errors).

It is to be understood that any of the above modifications can be applied singly or in combination to the respective aspects to which they refer, unless they are explicitly stated as excluding alternatives.

BRIEF DESCRIPTION OF THE DRAWINGS

Further details, features, objects, and advantages are apparent from the following detailed description of the preferred embodiments of the present invention which is to be taken in conjunction with the appended drawings, wherein:

FIG. 5 shows an apparatus according to an example embodiment of the invention;

FIG. 6 shows a method according to an example embodiment of the invention;

FIG. 7 shows an apparatus according to an example embodiment of the invention;

FIG. 8 shows a method according to an example embodiment of the invention;

FIG. 9 shows an apparatus according to an example embodiment of the invention.

FIG. 10 shows a method according to an example embodiment of the invention;

DETAILED DESCRIPTION OF CERTAIN EMBODIMENTS

Figure 1:
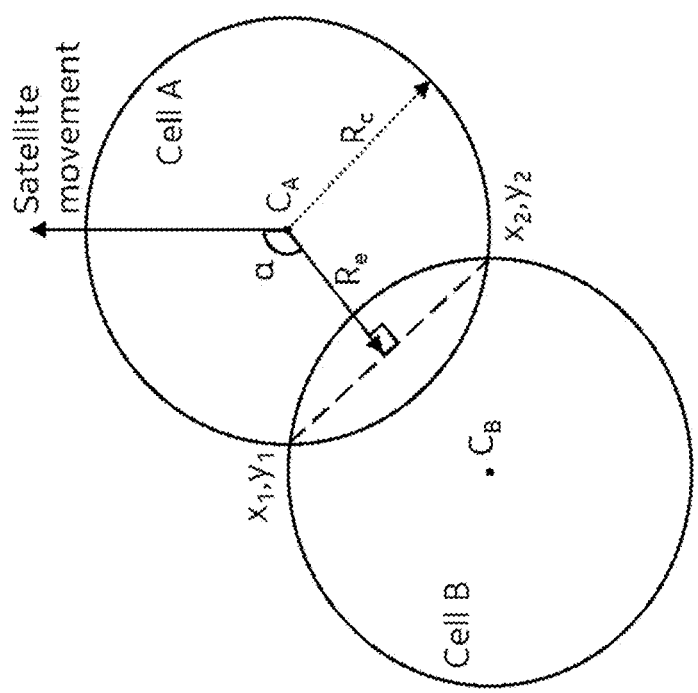
FIG. 1 shows some parameters which may be used for intra-satellite handover according to some example embodiments of the invention.

Herein below, certain embodiments of the present invention are described in detail with reference to the accompanying drawings, wherein the features of the embodiments can be freely combined with each other unless otherwise described. However, it is to be expressly understood that the description of certain embodiments is given by way of example only, and that it is by no way intended to be understood as limiting the invention to the disclosed details.

Moreover, it is to be understood that the apparatus is configured to perform the corresponding method, although in some cases only the apparatus or only the method are described.

The prior art solutions rely on UE measurements of at least one of RSRP and RSRQ and distance between UE and cells. Independently of whether the 5G NR baseline HO or conditional handover is used, they involve signalling between the UE and the gNB to configure and report measurements and target cells.

Some example embodiments of the invention avoid radio link failures while reducing signalling overhead in an Earth-moving cell scenario of NTN. They exploit the following insight:
1. Satellites move at high speeds but follow deterministic trajectories that can be predicted. This translates into the possibility of accurately estimating the NTN cells' centre location.
2. Intra-satellite mobility represents a particular scenario where radio propagation conditions (i.e. path loss, shadow fading, and line-of-sight) are fully correlated among NTN cells. This is because all NTN cells are radiated from satellite beams of the same satellite.
3. This fact results in a predictable scenario since signal conditions become static between adjacent satellite beams of the same satellite.
4. The full correlation of the radio propagation conditions together with the predictability of the NTN cells' movement enables new HO solutions where the UE does not need to rely on DL radio measurement information to reliably move among intra-satellite cells.

Some example embodiments of this invention utilize the NW antenna gain (AG) patterns to determine when a UE shall perform an intra-satellite handover. There are two main concepts:
A. The UE may determine the coverage boundary between neighboured cells of the same satellite based on information on the cells received from the satellite and its own position on earth; if the UE crosses the coverage boundary, the UE may trigger its serving cell to initiate a handover (for example by sending a measurement report) or it may perform CHO (if previously configured).
B. The base station (via the satellite) may initiate the handover based on its knowledge of the coverage boundary and the position of the UE. The UE may have signalled its position to the base station (via the satellite). In some example embodiments, it is additionally taken into account that the assumed position of the UE (i.e., the position of the UE known to the satellite) might be outdated. In these example embodiments, the UE performs the handover only if the assumed position and the actual position of the UE deviate by not more than a threshold. The threshold may be predefined, or the base station (via the satellite) may inform the UE on the threshold (e.g. via SIB broadcasting or dedicated signalling). The threshold may be generally valid for plural satellites, specific for the satellite, or specific for each cell sent from the satellite.

It is noted that the base station may be located in the satellite, or on the ground, or split between the ground (e.g. CU of the base station) and the satellite (e.g. DU of the base station).

At the coverage boundary, the signal strengths of the neighbouring cells are equal. FIG. 1 shows some parameters that may be used to determine the coverage boundary. In the example of FIG. 1, the cells and their antenna gains have circular geometry, and the coverage boundary is a straight line, but both is not mandatory.

Assuming regular AG patterns (where the beams have the same shape) for the different beams at the satellite, the boundary defines the point where the signal strengths from cell A and cell B are equal. The coverage boundary is different from the coverage radius $R_c$ (also denoted cell radius, corresponding to the radio coverage, i.e., there is a certain minimum signal level within the coverage radius (cell radius)). 3GPP discusses the latter to signal for UE mobility. However, as may be seen from FIG. 1, using the coverage radius may result in suboptimal handover performance, because a UE is likely to trigger the mobility event too late.

In the example of FIG. 1, the UE may determine the coverage boundary defined by the coordinates $(x_1,y_1)$ and $(x_2,y_2)$ as follows (for simplicity the z-domain is omitted from these descriptions):

a) Assuming the boundary is a straight line, an effective coverage radius Re can be signaled by the network or estimated by the UE. The effective coverage radius is a line that is perpendicular to the coverage boundary line and goes through the center of the cell. The base station (via the satellite) provides additionally to the UE the angle α between the movement direction of the satellite and the and the coverage radius and the speed of the satellite. The difference between Re and Rc depends on the coverage overlap, which can be about 10 km for a LEO satellite at 600 km according to the scenario described in 3GPP TR 38.821.

b) Alternatively, the UE can calculate the two circles' points of intersection $(x_1,y_1)$ and $(x_2,y_2)$ if the UE is aware of the cell centers $(C_a,C_b)$ and coverage radius $(R_c)$.

In general, in the concept A, the UE may use any combination of parameters provided by the base station (via the satellite) that enable the UE to determine the coverage boundary. Examples of such parameters are ephemeris data of the satellite, a speed of the satellite relative to earth, a movement direction of the satellite relative to the earth, a location of a center of the first cell on the earth at a first time and the first time, a location of a center of the second cell on the earth at a second time and the second time, a radius of the first cell on the earth, a radius of the second cell on the earth, an elevation angle of the first cell, an elevation angle of the second cell, an effective coverage radius of the first cell towards the second cell on the earth, an angle between the effective coverage radius of the first cell and the movement direction of the satellite, an effective coverage radius of the second cell towards the first cell on the earth, an angle between the effective coverage radius of the second cell and the movement direction of the satellite, one or more locations of points on the coverage boundary at a third time and the third time. If the first, second, and third time, respectively, is the current time, the respective indication of the time may be omitted.

In the concept A, the satellite may provide the parameters needed for determining the coverage boundary to the UE. For example, each cell of the satellite may provide its own parameters. As another option, each cell (or only some cells in the movement direction) may provide the parameters for all the cells of the satellite or a subset thereof.

In the concept B, the satellite may use any feasible combination of these parameters to determine if the UE is on one or the other side of the coverage boundary.

Figure 2:
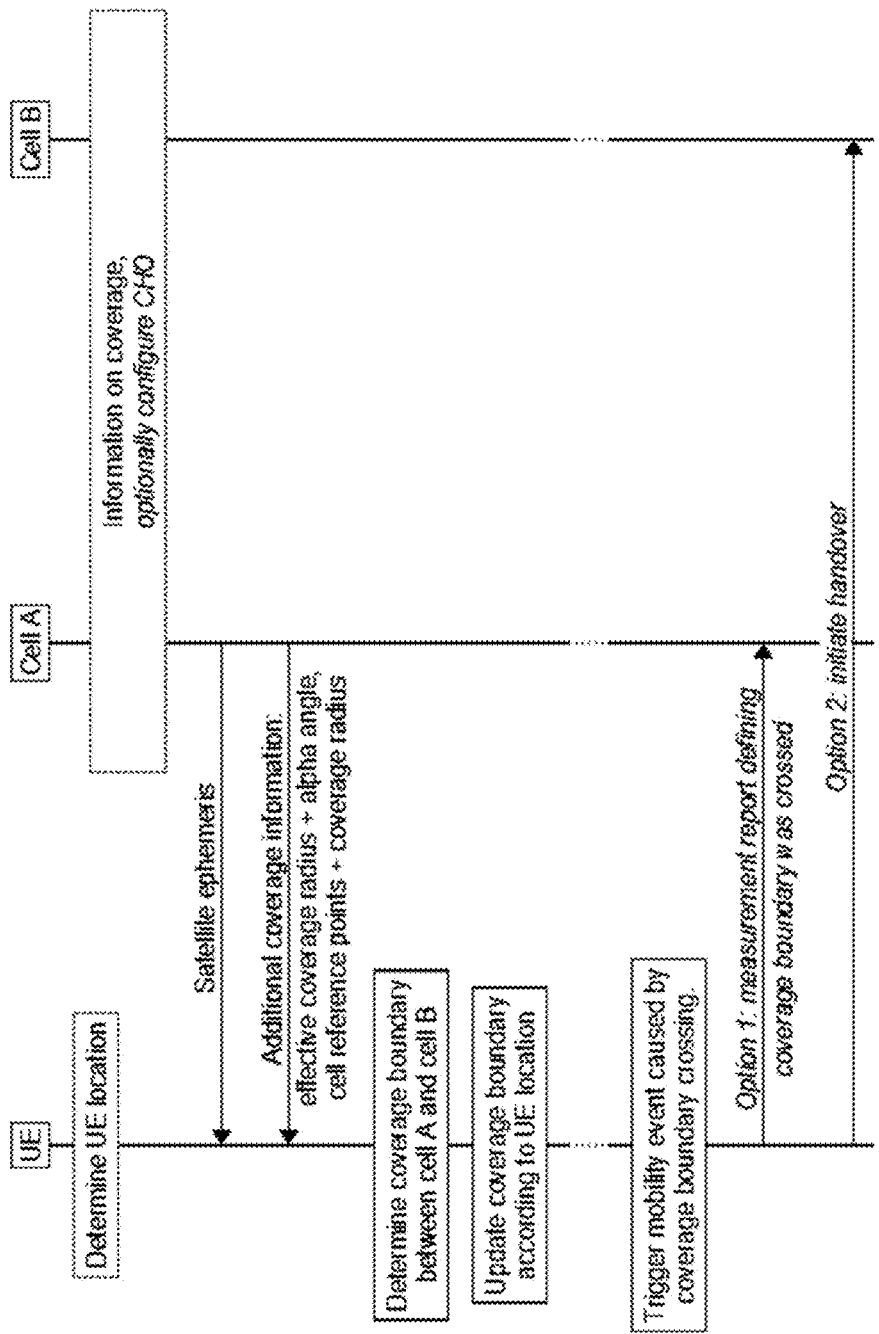
FIG. 2 shows a message flow according to some example embodiments of the invention.

FIG. 2 shows a message sequence chart according to concept A of some example embodiments of the invention. As shown in FIG. 2, the UE receives the satellite's ephemeris data and additional coverage information, as outlined above. The UE determines the coverage boundary and may update the coverage boundary from time to time (e.g. regularly, with a time interval which may be predefined or provided by the satellite). For example, it may update the coverage boundary by a recalculation. As another option, the UE may update the coverage boundary according to satellite ephemeris: when the UE has once determined the coverage boundary, it can update it based on satellite movement, because the cell boundary will remain fixed relatively to the satellite in the earth-moving cell scenario.

The UE will trigger the mobility event (measurement report or CHO) when it is on the side of cell B of the coverage boundary although it is served by cell A. In some example embodiments, the UE may directly determine whether it is on the side of cell B of the coverage boundary although it is served by cell A. In some example embodiments, instead, the UE may detect that it crossed the coverage boundary by storing a time a time evolution of his position relative to the coverage boundary. The time evolution may be reset when the UE performs a handover. The crossing of the coverage boundary may be caused by UE movement, satellite movement, or a combination thereof. In case of measurement reports being configured and triggered, the UE may also notify the network in advance that a boundary crossing is imminent.

If the UE crosses the coverage boundary, there are three options:

1. If a measurement report is configured, the UE may indicate in the measurement report that the event was a "coverage boundary crossing".
2. In some example embodiments, the measurement report may be empty such that the UE indicates only the event "coverage boundary crossing". This option applies even if a measurement report is not configured.
3. The UE may be configured for CHO with the trigger event "coverage boundary crossing". In this case, UE performs the CHO.

Which of options 1 and 2 is chosen may depend on implementation. In some example embodiments, the satellite may configure the option in the UE.

Figure 3:
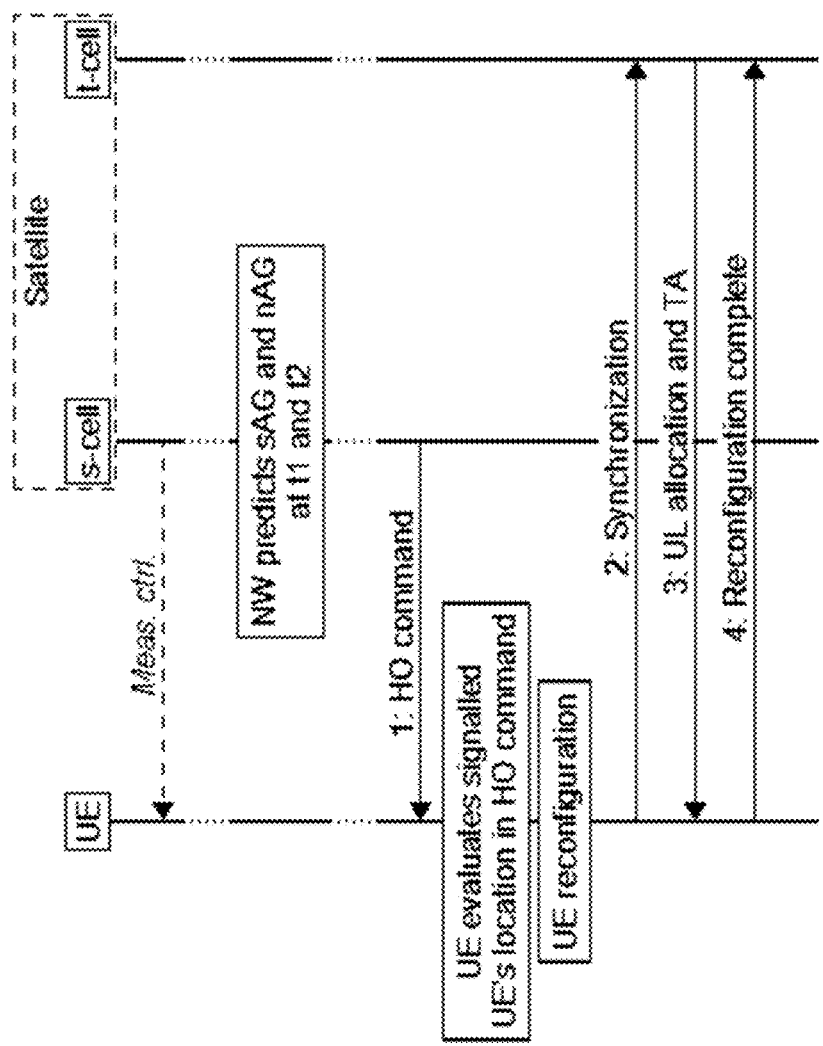
FIG. 3 shows a message flow according to some example embodiments of the invention.
Figure 4:
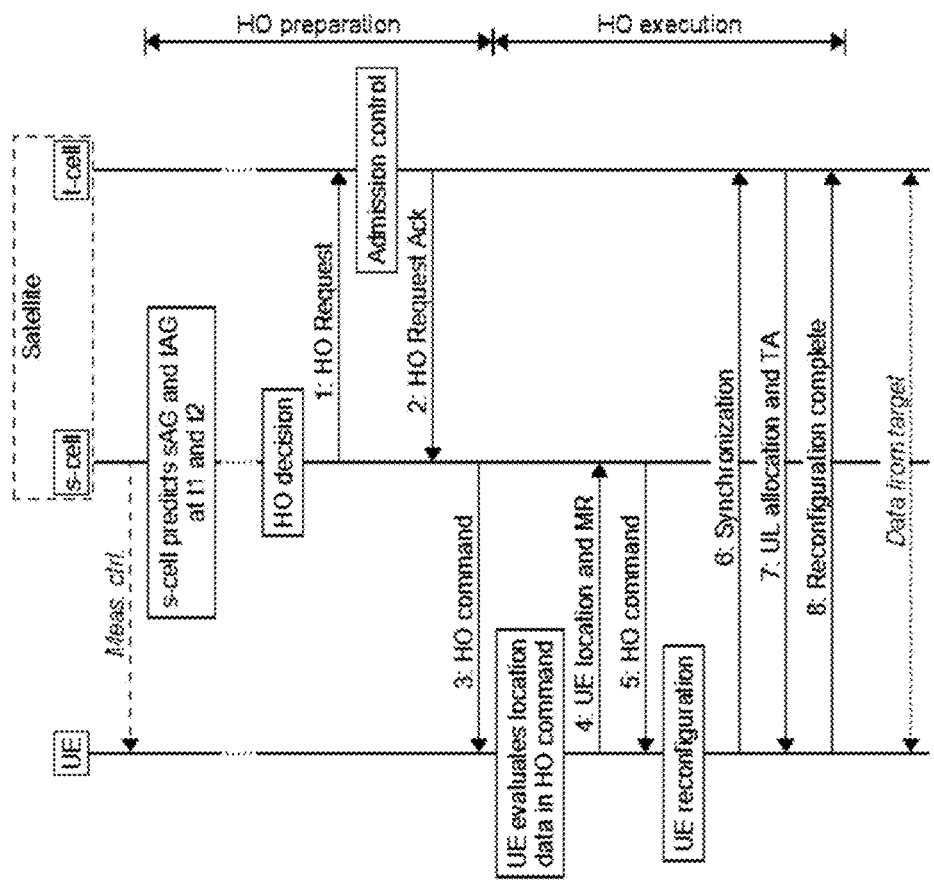
FIG. 4 shows a message flow according to some example embodiments of the invention.

FIGS. 3 and 4 show message sequence charts of concept B according to some example embodiments of the invention. According to the concept B, the network is responsible for estimating the cell coverage overlap (and thus the coverage boundary) based on antenna gain and for sending a HO command to the UE. In some example embodiments of the concept B, the HO signalling exchanged between the UE and the NW is modified to avoid that the UE performs a handover triggered by the satellite based on outdated UE location information due to UE's mobility (optional).

Specifically, in some example embodiments, the NW (satellite) collects the following information:

A. UE's location (e.g. based on GNSS)
B. Satellite position
C. Satellite beams' pointing vectors for relevant cells
D. Antenna radiation pattern for each of the relevant cells The satellite may know the UE's location (an assumed location) from any previous occasion where the UE provided its location to the satellite, for example from a previous (failed) handover sequence according to concept B, as outlined hereinafter.

Based on this information (or other information allowing to determine the coverage boundary, as outlined in the context of concept A), the NW estimates the serving cell AG (sAG) and target cell (neighboring cell) AG (tAG) at the current time and/or at least one future time $t_1$ (potentially at plural future times $t_1$ and $t_2$) for the UE's location. If, according to this estimation, the UE has crossed or will have crossed the coverage boundary, the NW (satellite) triggers a handover of the UE.

In some example embodiments, as shown in FIG. 3, the NW (satellite) predicts $tAG(t_1)$, $SAG(t_1)$, $tAG(t_2)$ and $sAG(t_2)$ with $t_2>t_1$. In these embodiments, if $tAG(t_1)$ is greater than $SAG(t_1)$—indicating the target cell provides better radio conditions than the serving cell—and $tAG(t_2)$ is greater than $sAG(t_2)$—indicating the target cell radio conditions are improving from $t_1$ and $t_2$; the NW (satellite) sends the HO command to the UE with the information to initiate the access towards the target cell that fulfills the above conditions. If the latter condition is not fulfilled, the NW (satellite) may not send the handover command in order to avoid an unnecessary ping-pong HO.

In some example embodiments, as shown in FIGS. 3 and 4, the HO command (RRCreconfiguration IE) contains the assumed UE location that the NW (satellite) used for its estimations (or the satellite may provide the assumed UE location to the UE by a dedicated command along with the (unmodified) handover command). When UE receives the HO command and the assumed UE location, the UE updates its location and compares its actual location with the assumed UE location provided by the satellite. If the actual location and the assumed location match (i.e., they deviate by not more than a threshold), the UE performs the handover, as usual and as shown in FIG. 3.

If the assumed UE location in the HO command (or provided along with the HO command) is outdated (i.e., they deviate by at least the threshold), the UE does not perform the HO procedure. In some example embodiments, as shown in FIG. 4, the UE provides its actual location to the satellite in response to the handover command after which the NW can repeat the procedure with the actual location instead of the outdated location, or instruct the UE to proceed with legacy HO/CHO.

The threshold may be predefined in the UE, or the NW (satellite) may provide the threshold to the UE. The threshold may be specific for a cell, specific for some or all cells of the satellite, or valid for plural satellites.

In some example embodiments, the UE may ignore the HO command if the assumed location is outdated. The NW may request a UE location update if NW detects that the UE does not initiate the HO within a predefined delay time.

FIG. 5 shows an apparatus according to an example embodiment of the invention. The apparatus may be a terminal (such as a UE, a MTC device etc.) or an element thereof. FIG. 6 shows a method according to an example embodiment of the invention. The apparatus according to FIG. 5 may perform the method of FIG. 6 but is not limited to this method. The method of FIG. 6 may be performed by the apparatus of FIG. 5 but is not limited to being performed by this apparatus.

The apparatus comprises means for receiving 110, means for determining 120, means for checking 130, and at least one of means for reporting 140, means for initiating 150, and means for triggering 160. The means for receiving 110, means for determining 120, means for checking 130, means for reporting 140, means for initiating 150, and means for triggering 160 may be a receiving means, determining means, checking means, reporting means, initiating means, and triggering means, respectively. The means for receiving 110, means for determining 120, means for checking 130, means for reporting 140, means for initiating 150, and means for triggering 160 may be a receiver, determiner, checker, report, initiator, and trigger, respectively. The means for receiving 110, means for determining 120, means for checking 130, means for reporting 140, means for initiating 150, and means for triggering 160 may be a receiving processor, determining processor, checking processor, reporting processor, initiating processor, and triggering processor, respectively.

The means for receiving 110 receives information allowing to determine a coverage boundary between a first cell of a satellite and a second cell of the satellite (S110). Examples of such information comprise any feasible combination of ephemeris data of the satellite, a speed of the satellite relative to earth, a movement direction of the satellite relative to the earth, a location of a center of the first cell on the earth at a first time and the first time, a location of a center of the second cell on the earth at a second time and the second time, a radius of the first cell on the earth, a radius of the second cell on the earth, an elevation angle of the first cell, an elevation angle of the second cell, an effective coverage radius of the first cell towards the second cell on the earth, an angle between the effective coverage radius of the first cell and the movement direction of the satellite, an effective coverage radius of the second cell towards the first cell on the earth, an angle between the effective coverage radius of the second cell and the movement direction of the satellite, one or more locations of points on the coverage boundary at a third time and the third time.

The means for determining 120 determines the coverage boundary based on the received information (S120). The means for checking 130 checks whether the terminal is on the side of the second cell of the coverage boundary and the terminal is being served by the first cell (S130). For example, the means for checking 130 may check if the terminal crossed the coverage boundary from the side of the first cell to the side of the second cell without performing a handover to the second cell.

Depending on implementation, the apparatus may comprise one or more of the means for reporting 140, means for initiating 150, and means for triggering 160. If the terminal is on the side of the second cell of the coverage boundary and being served by the first cell (S130=yes), depending on implementation and configuration at least one of the following may be performed:

The means for reporting 140 may report to the first cell that the terminal is on the side of the second cell of the coverage boundary (S140). Thus, for example, the satellite may trigger a handover of the UE to the second cell;

The means for initiating 150 may initiate a handover of the terminal from the first cell to the second cell (S150);

The means for triggering 160 may trigger the terminal to execute a conditional handover from the first cell to the second cell if the terminal is configured for the conditional handover (S160).

FIG. 7 shows an apparatus according to an example embodiment of the invention. The apparatus may be a satellite or an element thereof, or a network communicating with a terminal via the satellite or an element thereof. FIG. 8 shows a method according to an example embodiment of the invention. The apparatus according to FIG. 7 may perform the method of FIG. 8 but is not limited to this method. The method of FIG. 8 may be performed by the apparatus of FIG. 7 but is not limited to being performed by this apparatus.

The apparatus comprises means for providing 210. The means for providing 210 may be a providing means. The means for providing 210 may be a provider. The means for providing 210 may be a providing processor.

The means for providing 210 provides to a terminal, information allowing to determine a coverage boundary between a first cell of a satellite and a second cell of the satellite. Examples of such information comprise any feasible combination of ephemeris data of the satellite, a speed of the satellite relative to earth, a movement direction of the satellite relative to the earth, a location of a center of the first cell on the earth at a first time and the first time, a location of a center of the second cell on the earth at a second time and the second time, a radius of the first cell on the earth, a radius of the second cell on the earth, an elevation angle of the first cell, an elevation angle of the second cell, an effective coverage radius of the first cell towards the second cell on the earth, an angle between the effective coverage radius of the first cell and the movement direction of the satellite, an effective coverage radius of the second cell towards the first cell on the earth, an angle between the effective coverage radius of the second cell and the movement direction of the satellite, one or more locations of points on the coverage boundary at a third time and the third time.

FIG. 9 shows an apparatus according to an example embodiment of the invention. The apparatus may be a terminal (such as a UE or a MTC device) or an element thereof. FIG. 10 shows a method according to an example embodiment of the invention. The apparatus according to FIG. 9 may perform the method of FIG. 10 but is not limited to this method. The method of FIG. 10 may be performed by the apparatus of FIG. 9 but is not limited to being performed by this apparatus.

The apparatus comprises means for receiving 310, means for determining 320, means for checking 330, and means for preventing 340. The means for receiving 310, means for determining 320, means for checking 330, and means for preventing 340 may be a receiving means, determining means, checking means, and preventing means, respectively. The means for receiving 310, means for determining 320, means for checking 330, and means for preventing 340 may be a receiver, determiner, checker, and preventer, respectively. The means for receiving 310, means for determining 320, means for checking 330, and means for preventing 340 may be a receiving processor, determining processor, checking processor, and preventing processor, respectively.

The means for receiving 310 receives, from a first cell of a satellite, a handover command and an assumed location of a terminal (S310). The handover commands triggering a handover of the terminal from the first cell of the satellite to a second cell of the satellite.

The means for determining 320 determines an actual location of the terminal (S320). The means for checking 330 checks whether the actual location of the terminal deviates from the assumed location by more than a first threshold (S330). In some example embodiments, instead of or in addition to checking whether the actual location of the terminal deviates from the assumed location by more than the first threshold, the means for checking 330 checks whether the actual location of the terminal is on the side of the first cell of the coverage boundary and remote from the coverage boundary by at least a second threshold (S330).

Each of the first threshold and the second threshold may be predetermined or provided by the satellite.

If the actual location of the terminal deviates from the assumed location by more than the threshold or if the actual location of the terminal is on the side of the first cell of the coverage boundary and remote from the coverage boundary by at least a second threshold (S330=yes), the means for preventing 340 prevents the terminal from performing the handover triggered by the handover command received in S310 (S340). In some example embodiments of the invention, if the means for checking 330 checks both conditions, only one of the above conditions has to be fulfilled to cause the means for preventing 340 prevent the handover. In some of these example embodiments, both conditions have to be fulfilled to cause the means for preventing 340 prevent the handover.

Figure 12:
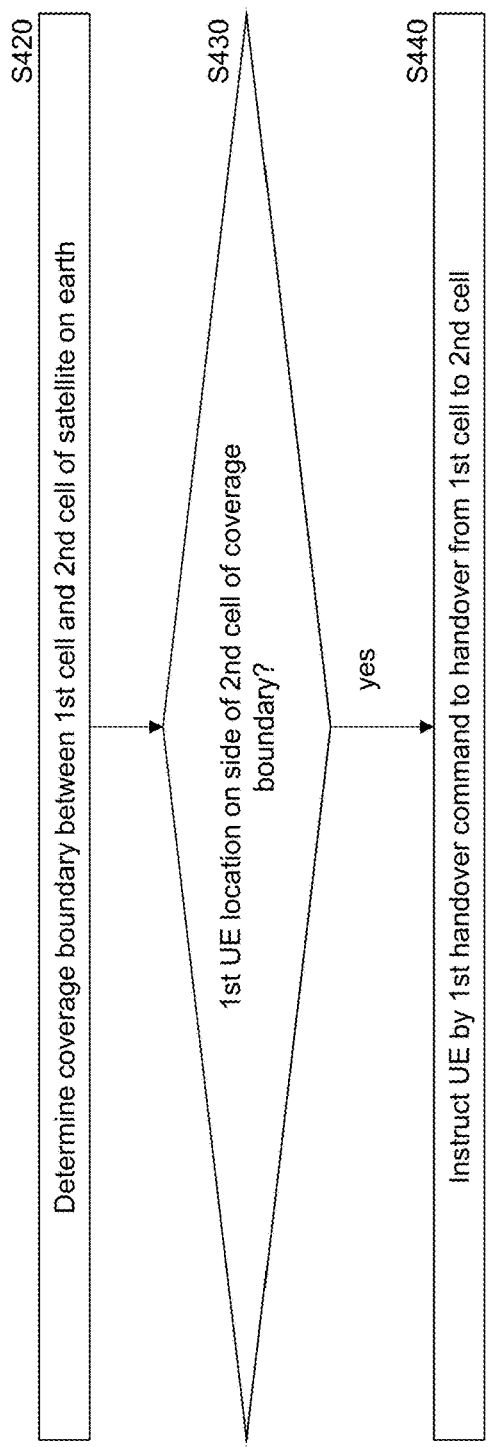
FIG. 12 shows a method according to an example embodiment of the invention.
Figure 11:
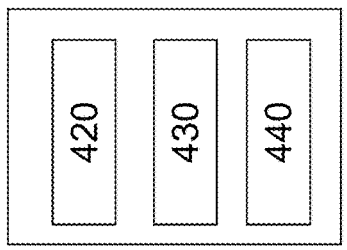
FIG. 11 shows an apparatus according to an example embodiment of the invention.

FIG. 11 shows an apparatus according to an example embodiment of the invention. The apparatus may be a satellite or an element thereof, or a network communicating with a terminal via the satellite or an element thereof. FIG. 12 shows a method according to an example embodiment of the invention. The apparatus according to FIG. 11 may perform the method of FIG. 12 but is not limited to this method. The method of FIG. 12 may be performed by the apparatus of FIG. 11 but is not limited to being performed by this apparatus.

The apparatus comprises means for determining 420, means for checking 430, and means for instructing 440. The means for determining 420, means for checking 430, and means for instructing 440 may be a determining means, checking means, and instructing means, respectively. The means for determining 420, means for checking 430, and means for instructing 440 may be a determiner, checker, and instructor, respectively. The means for determining 420, means for checking 430, and means for instructing 440 may be a determining processor, checking processor, and instructing processor, respectively.

The means for determining 420 determines a coverage boundary between a first cell of the satellite and a second cell of the satellite on the earth (S420).

The means for checking 430 checks whether a first location of a terminal is on the side of the second cell of the coverage boundary (S430). The first location is stored for usage by the means for checking 430, e.g. after it was previously received from the terminal, or as a predefined location of a (stationary) UE. If the first location is on the side of the second cell of the coverage boundary (S430=yes), the means for instructing 440 instructs the terminal by a handover command to handover from the first cell to the second cell (S440).

Figure 13:
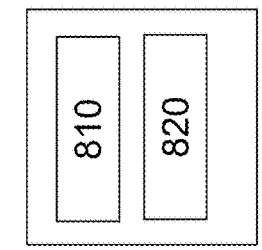
FIG. 13 shows an apparatus according to an example embodiment of the invention.

FIG. 13 shows an apparatus according to an example embodiment of the invention. The apparatus comprises at least one processor 810, at least one memory 820 including computer program code, and the at least one processor 810, with the at least one memory 820 and the computer program code, being arranged to cause the apparatus to at least perform at least the method according to at least one of FIGS. 6, 8, 10, and 12 and related description.

Some example embodiments are explained with respect to a 5G network. However, the invention is not limited to 5G. It may be used in other communication networks using satellites with earth-moving cells, too, e.g. in previous of forthcoming generations of 3GPP networks such as 4G, 6G, or 7G, etc. It may be used in non-3GPP communication networks, too.

The location of the UE may be obtained from GNSS, a core network element (location server), or the location may be hardcoded (for a stationary UE).

One piece of information may be transmitted in one or plural messages from one entity to another entity. Each of these messages may comprise further (different) pieces of information.

Names of network elements, network functions, protocols, and methods are based on current standards. In other versions or other technologies, the names of these network elements and/or network functions and/or protocols and/or methods may be different, as long as they provide a corresponding functionality. The same applies correspondingly to the terminal.

If not otherwise stated or otherwise made clear from the context, the statement that two entities are different means that they perform different functions. It does not necessarily mean that they are based on different hardware. That is, each of the entities described in the present description may be based on a different hardware, or some or all of the entities may be based on the same hardware. It does not necessarily mean that they are based on different software. That is, each of the entities described in the present description may be based on different software, or some or all of the entities may be based on the same software. Each of the entities described in the present description may be deployed in the cloud.

According to the above description, it should thus be apparent that example embodiments of the present invention provide, for example, a terminal (such as a UE, a MTC device, etc.) or a component thereof, an apparatus embodying the same, a method for controlling and/or operating the same, and computer program(s) controlling and/or operating the same as well as mediums carrying such computer program(s) and forming computer program product(s). According to the above description, it should thus be apparent that example embodiments of the present invention provide, for example, a satellite or a cell thereof, or a component of any of them, an apparatus embodying the same, a method for controlling and/or operating the same, and computer program(s) controlling and/or operating the same as well as mediums carrying such computer program(s) and forming computer program product(s).

Implementations of any of the above described blocks, apparatuses, systems, techniques or methods include, as non-limiting examples, implementations as hardware, software, firmware, special purpose circuits or logic, general purpose hardware or controller or other computing devices, or some combination thereof. Each of the entities described in the present description may be embodied in the cloud.

It is to be understood that what is described above is what is presently considered the preferred example embodiments of the present invention. However, it should be noted that the description of the preferred example embodiments is given by way of example only and that various modifications may be made without departing from the scope of the invention as defined by the appended claims.

The phrase "at least one of A and B" comprises the options only A, only B, and both A and B. The terms "first X" and "second X" include the options that "first X" is the same as "second X" and that "first X" is different from "second X", unless otherwise specified.

The invention claimed is:

1. An apparatus comprising:
one or more processors, and
memory storing instructions that, when executed by the one or more processors, cause the apparatus to at least perform:
receiving, from a first cell of a satellite, information allowing to determine a coverage boundary between the first cell of the satellite and a second cell of the satellite, the information comprising:
one or more locations of points on the coverage boundary at a time,
the time,
ephemeris data of the satellite, and
information on a movement of the coverage boundary;
determining the coverage boundary based on the received information, the coverage boundary being within a coverage overlap between the first and second cells of the satellite and being different from cell boundaries of the first and second cells of the satellite;
checking whether the apparatus is on the side of the second cell of the coverage boundary and the apparatus is being served by the first cell;
if the apparatus is on the side of the second cell of the coverage boundary and being served by the first cell, performing:
initiating a handover of the apparatus from the first cell to the second cell; and
triggering the apparatus to execute a conditional handover from the first cell to the second cell if the apparatus is configured for the conditional handover,
wherein the handover or the conditional handover is triggered based on a result of the checking indicating that the apparatus is on the side of the second cell of the coverage boundary and the apparatus is being served by the first cell.

2. The apparatus according to claim 1, wherein the instructions, when executed by the one or more processors, cause the apparatus to perform the determining the coverage boundary based further on a previously determined position of the coverage boundary.

3. The apparatus according to claim 1, wherein the instructions, when executed by the one or more processors, further cause the apparatus to perform
predicting a time when the apparatus crosses the coverage boundary based on a position of the apparatus, a position of the coverage boundary, and a movement of the coverage boundary;
informing the first cell on the predicted time.

4. The apparatus according to claim 1, wherein the instructions, when executed by the one or more processors, cause the apparatus to perform the checking whether the apparatus is on the side of the second cell of the coverage boundary is based on the location of the apparatus and the determined coverage boundary, wherein the apparatus obtains the location of the apparatus from a global navigation satellite system, and
wherein the coverage boundary within the coverage overlap between the first and second cells of the satellite comprise locations where signal strengths from the first and second cells of the satellite are estimated to be equal.

5. The apparatus according to claim 1, wherein the handover or the conditional handover are not triggered based on reference signal measurements by the apparatus.

6. The apparatus according to claim 5, wherein the instructions, when executed by the one or more processors, further cause the apparatus to at least perform:
in case a measurement report is configured, transmitting a measurement report indicating an event of coverage boundary crossing.

7. The apparatus according to claim 5, wherein the instructions, when executed by the one or more processors, further cause the apparatus to at least perform:
in case a measurement report is not configured, transmitting an empty measurement report indicating only an event of coverage boundary crossing.

8. The apparatus according to claim 5, wherein the conditional handover is configured with a trigger event of coverage boundary crossing.

9. A method comprising:
receiving, from a first cell of a satellite, information allowing to determine a coverage boundary between the first cell of the satellite and a second cell of the satellite, the information comprising:
  one or more locations of points on the coverage boundary at a time,
  the time,
  ephemeris data of the satellite, and
information on a movement of the coverage boundary;
determining the coverage boundary based on the received information, the coverage boundary being within a coverage overlap between the first and second cells of the satellite and being different from cell boundaries of the first and second cells of the satellite;
checking whether a terminal is on the side of the second cell of the coverage boundary and the terminal is being served by the first cell;
if the terminal is on the side of the second cell of the coverage boundary and being served by the first cell, performing:
  initiating a handover of the terminal from the first cell to the second cell; and
  triggering the terminal to execute a conditional handover from the first cell to the second cell if the terminal is configured for the conditional handover,
  wherein the handover or the conditional handover is triggered based on a result of the checking indicating that the terminal is on the side of the second cell of the coverage boundary and the terminal is being served by the first cell.

10. The method according to claim 9, wherein the coverage boundary is determined based further on a previously determined position of the coverage boundary.

11. The method according to claim 9, further comprising
predicting a time when the terminal crosses the coverage boundary based on a position of the terminal, a position of the coverage boundary, and a movement of the coverage boundary;
informing the first cell on the predicted time.

12. The method according to claim 9, wherein the checking whether the terminal is on the side of the second cell of the coverage boundary is based on the location of the terminal and the determined coverage boundary, wherein the location of the terminal is obtained from a global navigation satellite system,
wherein the coverage boundary within the coverage overlap between the first and second cells of the satellite comprise locations where signal strengths from the first and second cells of the satellite are estimated to be equal.

13. The method according to claim 9, wherein the handover or the conditional handover are not triggered based on reference signal measurements by the terminal.

14. The method according to claim 13, further comprising:
in case a measurement report is configured, transmitting a measurement report indicating an event of coverage boundary crossing.

15. The method according to claim 13, further comprising:
in case a measurement report is not configured, transmitting an empty measurement report indicating only an event of coverage boundary crossing.

16. The method according to claim 13, wherein the conditional handover is configured with a trigger event of coverage boundary crossing.

* * * * *